US006178790B1

(12) United States Patent
Chiarelli

(10) Patent No.: US 6,178,790 B1
(45) Date of Patent: Jan. 30, 2001

(54) SAFETY PADLOCK ASSEMBLY

(76) Inventor: John Chiarelli, 35-05 210 $^{th}$ , Bayside, NY (US) 11361

( * ) Notice: Under 35 U.S.C. 154(b), the term of this patent shall be extended for 0 days.

(21) Appl. No.: 09/252,353

(22) Filed: Feb. 17, 1999

Related U.S. Application Data

(60) Provisional application No. 60/074,996, filed on Feb. 17, 1998.

(51) Int. Cl.$^7$ .................................................... B60R 25/00

(52) U.S. Cl. ............................ 70/256; 292/171; 292/173; 70/2

(58) Field of Search .................................... 70/256, 2–13; 292/171, 173, 110, 148

(56) References Cited

U.S. PATENT DOCUMENTS

| | | | |
|---|---|---|---|
| 199,713 * | 1/1878 | Hoyt | 70/256 X |
| 233,711 * | 10/1880 | Spencer | 292/173 |
| 641,471 * | 1/1900 | Scheel | 292/173 |
| 947,528 * | 1/1910 | Hunter | 292/173 |
| 1,167,011 * | 1/1916 | Nelson | 292/173 |
| 1,753,513 * | 4/1930 | Hansen | 292/171 |
| 1,763,694 * | 6/1930 | Ferris | 292/110 |
| 2,007,854 * | 7/1935 | Grill | 292/173 |
| 2,336,458 * | 12/1943 | Bales et al. | 292/173 |
| 2,970,856 * | 2/1961 | Hansen | 292/173 |
| 3,498,658 * | 3/1970 | Steenstra et al. | 292/171 X |
| 4,080,757 * | 3/1978 | Westerman | 292/171 X |

FOREIGN PATENT DOCUMENTS

| | | | |
|---|---|---|---|
| 10955 * | 7/1908 | (DK) | 292/171 |
| 450580 * | 7/1936 | (GB) | 292/171 |

* cited by examiner

*Primary Examiner*—Suzanne Dino Barrett
(74) *Attorney, Agent, or Firm*—Orrick, Herrington & Sutcliffe LLP

(57) ABSTRACT

As assembly is provided for securing a door to a fixed object which allows the door to be locked from the outside with a conventional padlock, but which allows the door to be opened from the interior while the padlock is in place. The door has a first face, a second face and an edge. The fixed object typically includes an abutment. Means are provided for engaging the door to the abutment. The engaging means are disposed on the first face of the door proximate to the edge and are movable from an engaged position in which the door is engaged to the abutment, to a released position in which the door is disengaged from the abutment. Means are also provided for biasing the engaging means toward the engaging position. A flexible cord is attached to the engaging means. An active hasp is connected to the flexible cord distal to the engaging means and is disposed on the second face of the door. Means are provided for securing the active hasp in fixed position on the second face of the door when the engaging means is in the engaged position. When the active hasp is displaced, the flexible cord actuates the engaging means, overcoming the bias of the biasing means and displacing the engaging means toward the released position. Consequently, the door can be opened from the interior while the padlock is in place.

20 Claims, 7 Drawing Sheets

SAFETY PADLOCK ASSEMBLY

This application claims benefit to Provisional application Serial No. 06/074,996, filed Feb. 17, 1998.

BACKGROUND OF THE INVENTION

This invention is related to the field of locking mechanisms. In particular, the invention is directed to a safety lock assembly for a door which can be locked externally and still allow a person on the interior of the door to open the lock assembly and thus the door.

It is common to provide doors with a lock to prevent unauthorized access. One such lock, which is readily available and simple to use, is a padlock latch assembly. Padlock latch assemblies include two hasps: one that is attached to the exterior of the door to be locked, and one that is attached to a fixed object, such as the door jam or the mating door of a two-door closure. The padlock is slipped through openings in the hasps, preventing them from being moved apart to any great degree. This provides a cost-effective locking mechanism that can be readily opened from the exterior of the door by one having a key. Unfortunately, once locked, there is no mechanism to open the lock from the interior of the door. This is not only inconvenient but can be particularly dangerous should there be a need to evacuate a building through the door quickly, such as during a fire. A person would need to wait until the padlock was opened before exiting. Obviously, in certain instances, this added delay could be critical.

Various lock mechanisms have been developed in the past. None of these address the problems resolved by the instant invention. U.S. Pat. No. 2,007,854 is directed to a lock for doors such as on refrigerators. A bolt positioned on the exterior of the door is biased by a spring outward to an extended position. In this extended position, the bolt engages an undersurface of a head. The head is mounted to the exterior of one door while the bolt and related parts are mounted to the exterior of the other door. A lever is pivotally mounted to a lock casing. The lever is operably engaged to the bolt such that, when the lever is rotated to an open position, the bias of the spring is overcome and the bolt is retracted, disengaging the head. An aperture in the casing is provided to receive a padlock and thus prevent the lever from being moved to the open position. A cable is attached to the bolt and extends through a passageway in the door. A ring may be provided at one end of the cable. When the cable is pulled, the bolt overcomes the bias of the spring and disengages the head.

U.S. Pat. No. 1,167,011 is directed to a door lock for barn doors. A bolt is slidingly mounted within an edge of a door. A spring biases the bolt into an extended position such that it engages a cavity in a doorpost. Handles are pivotally mounted to the door and to the bolt. One handle is positioned on the interior of the door; the other handle is positioned on the exterior of the door. When either handle is rotated outwardly, it causes the bolt to be retracted overcoming the spring bias. Once retracted, the door can be swung to an open position. A hasp is provided at the exterior of the door to receive a pad lock and thus prevent the exterior handle from rotating.

U.S. Pat. No. 1,763,694 is directed to a deadbolt intended particularly for doors or windows that swing open from the top. A hollow bolt member cooperates with a catch to engage an angled piece. The catch is biased to a forward or locked position by a spring. A rod is pivotally mounted to the catch at one end and connected to a pull chain at the other. The pull chain is connected to an arm, which is positioned in a slot in the door. The arm is connected to an exterior handle. When the handle is pulled, the arm is displaced. The displacement of the arm causes the pull chain to move, overcoming the bias of the spring and retracting the catch thereby disengaging the angled piece. One the interior of the door, a thumb piece is pivotally mounted to the door proximate the arm. When the thumb piece is rotated, it also causes the displacement of the arm and the disengagement of the catch. There is no teaching of using a padlock with this door assembly.

SUMMARY OF INVENTION

It is an object of an aspect the present invention to provide a lock assembly which can be secured with an external lock while providing the ability to open the lock assembly from the interior even though the external lock is in place.

It is an object of an aspect of the invention to provide a lock assembly for a door that mounts the latch mechanism interior to the door, allows the door to be locked against exterior entry using a conventional padlock and permits a person on the interior to open the lock assembly without disengaging the padlock.

It is an object of another aspect of the invention to provide a lock assembly which can be locked externally with a conventional padlock, securing a door in a closed position, but which will allow the latch to be disengaged internally at all times but externally only when the padlock is removed.

It is an object of another aspect of the invention to provide an assembly for locking a door with a simple padlock which will restrict access from one side of the door but which does not restrict access from the other side of the door.

It is an object of another aspect of the invention to provide a locking assembly which is inexpensive to manufacture and which can be conveniently installed onto existing doors.

It is an object of another aspect of the invention to provide a locking assembly which includes a limited number of moving parts which can be readily replaced as they become worn over time, and which is simple to use and install.

It is an object of another aspect of the invention to provide a lock assembly that allows the replacement of the lock, whether for security purposes or simple maintenance, without requiring a locksmith.

In accord with an aspect of the invention, a lock assembly is provided for securing a door to a fixed object. The door has an interior face, an exterior face and an edge. The fixed object has an aperture. A mounting bracket is attached to the interior face of the door near the edge. A casing is mounted to the mounting bracket. A collar is disposed within the casing. A latch rod is slidingly mounted in the casing and journaled within the collar for movement along a latch rod axis. A latch tip is mounted to the latch rod near the edge. A spring is disposed in the casing between the collar and the latch tip, such that the latch tip is normally biased outward from the casing in a position to engage the aperture of the fixed object when the door is in a closed position (thus preventing the door from rotating). An anchor is mounted to the latch rod distal to the latch tip. A mooring is disposed on the anchor. A flexible release cord is attached to the mooring and directed over a guide pin away from the door at least substantially along the latch rod axis. Similarly, a flexible hasp cord is attached to the mooring and is directed over a guide pin and through the door at least substantially along the latch rod axis. An active hasp with an opening is connected to the flexible hasp cord distal to the mooring and is disposed at the exterior face of the door. A stationary hasp is fixedly attached to the door on the exterior face proximate to the active hasp. When the active hasp is displaced, the flexible hasp cord pulls on the anchor, overcoming the bias of the spring and disengaging the latch tip from the aperture. The door is thus free to rotate away from the fixed object.

In accord with another aspect of the invention, A lock assembly is provided for securing a door to a fixed object. The door has an interior face, an exterior face and an edge. The fixed object having an aperture. The door is movable from a closed position in which the edge is proximate to the aperture, to an open position in which the edge is remote from the aperture. A casing is mounted to the interior face of the door near the edge. A latch rod is slidingly mounted to the casing for movement along a latch rod axis. A latch tip is disposed on the latch rod near the edge. A spring is disposed in the casing and operably engaged to the latch rod, such that the latch tip is normally biased outward from the casing in a position to engage the aperture of the fixed object when the door is in the closed position. An anchor is mounted to the latch rod distal to the latch tip. A flexible release cord is attached to the anchor and directed, at least substantially, along the interior face of the door and along the latch rod axis. A flexible hasp cord is attached to the anchor and extends, at least substantially, along the latch rod axis. An active hasp is connected to the flexible hasp cord distal to the anchor and disposed at the exterior face of the door. A stationary hasp is fixedly mounted proximate to the active hasp. When the active hasp is displaced, the flexible hasp cord pulls on the anchor, overcoming the bias of the spring and disengaging the latch tip from the aperture.

Certain implementations of this aspect of the invention provide that the flexible hasp cord extends through the door; that the stationary hasp is fixedly mounted to the exterior face of the door, openings are positioned in the active hasp and the stationary hasp, and a padlock is engaged to the openings in the active hasp and the stationary hasp.

In accord with another aspect of the invention, a padlock safety assembly is provided for securing a movable door to fixed object such that the door can be locked in a closed position from exterior to the door while being openable from the interior of the door. The door has an interior face, an exterior face and a side edge and is movable from the closed position wherein the side edge of the door is proximate the fixed object to an open position wherein the side edge is remote from the fixed object. The fixed object has a lip. A latch rod is slidingly mounted to the interior face of the door proximate to the side edge. The latch rod is movable along a latch rod axis from a projected position in which it extends toward the side edge to a recessed position. A spring is attached to the latch rod and the door for biasing the latch rod toward the projected position. A flexible cord is attached to the latch rod and extends substantially along the latch rod axis and through the door. A hasp is connected to the flexible cord distal to the latch rod and is disposed at the exterior of the door. Means are provided for securing the hasp in a fixed position on the exterior face of the door. When the door is in the closed position and the latch rod is in the projected position, the latch rod engages the lip of the fixed object and, when the hasp is displaced, the flexible cord pulls on the latch rod, overcoming the bias of the spring and disengaging the latch rod from the lip.

Certain implementations of this aspect of the invention provide that: the fixed object includes a clip and the lip defines, at least in part, an aperture in the clip; a casing is mounted to the interior face of the door, the latch rod is disposed within the casing and the spring is a coil spring disposed about the latch rod; a latch tip with a beveled edge is mounted to the latch rod near the side edge of the door and is adapted to engage the lip of the fixed object; a flexible release cord is attached to the latch rod, disposed on the interior of the door and extending substantially along the latch rod axis; the securing means includes a stationary hasp mounted to the exterior of the door proximate to the hasp; the hasp and the stationary hasp are L-shaped rigid members; the hasp includes a loop formed in the flexible cord distal to the latch rod.

In accord with another aspect of the invention, a padlock assembly is provided for securing a movable door to fixed object. The door defines an interior region and an exterior region, and has a side edge. The fixed object has an abutment. The door is movable from the closed position wherein the side edge of the door is proximate the abutment, to an open position wherein the side edge is remote from the abutment. A latch rod is slidingly mounted to the door and disposed in the interior region. A latch tip is disposed on the latch rod near the outer edge of the door and is movable from a projected position in which the latch tip extends sufficiently to engage the abutment of the fixed object when the door is in a closed position to a recessed position in which the latch tip is displaced away from the abutment. Means are provided for biasing the latch rod toward the projected position. A flexible release cord is attached to the latch rod. A flexible hasp cord is attached to the latch rod and directed toward the door. An active hasp with an opening is connected to the flexible hasp cord distal to the latch rod and disposed at the exterior of the door. A stationary hasp fixedly is mounted proximate to the active hasp. When the active hasp is displaced, the flexible hasp cord pulls on the latch rod, overcoming the bias of the biasing means and disengaging the latch rod from the abutment.

In accord with another aspect of the invention, a lock assembly is provided for securing a door to an object. The door has a first face, a second face and an edge. The object has an abutment. Means are provided for engaging the door to the abutment. The engaging means are disposed on the first face of the door proximate to the edge and are movable from an engaged position in which the door is engaged to the abutment, to a released position in which the door is disengaged from the abutment. Means are also provided for biasing the engaging means toward the engaging position. A flexible cord is attached to the engaging means. An active hasp is connected to the flexible cord distal to the engaging means and is disposed on the second face of the door. Means are provided for securing the active hasp in fixed position on the second face of the door when the engaging means is in the engaged position. When the active hasp is displaced, the flexible cord actuates the engaging means, overcoming the bias of the biasing means and displacing the engaging means toward the released position.

Certain implementations of this aspect of the invention provide that: the engaging means includes a mounting bracket mounted to the interior face of the door near the edge; a casing is mounted to the mounting bracket; a collar is disposed within the casing; a latch rod is slidingly mounted to the casing and journaled within the collar for movement along a latch rod axis; a latch tip is mounted to the latch rod near the edge; an anchor is mounted to the latch rod distal to the latch tip; the biasing means includes a spring disposed in the casing between the collar and the latch tip, such that the latch tip is normally biased outward from the casing in a position to engage the abutment of the fixed object; the securing means comprises a stationary hasp fixedly attached to the door at the exterior face proximate to the active hasp; a flexible release cord is attached to the anchor and directed substantially along the latch rod axis.

In accord with yet another aspect of the invention, a padlock assembly is provided for securing a movable door to fixed object. The door defines an interior region and an exterior region, and has a side edge. The fixed object has an abutment. The door is movable from a closed position in which the side edge is proximate to the abutment, to an open position in which the side edge is remote from the abutment. A latch rod is slidingly mounted in the door, disposed in the interior region and movable from a projected position, in which the latch rod extends sufficiently to engage the abutment of the fixed object when the door is in a closed position, to a recessed position in which the latch rod is displaced away from the abutment. A spring is attached to the latch rod such that the latch rod is normally biased toward the projected position. A flexible hasp cord is attached to the latch rod. An active hasp is connected to the flexible hasp cord distal to the latch rod and disposed in the exterior region. Means are provided for securing the active hasp in a fixed position with respect to the door. When the active hasp is displaced, the flexible hasp cord pulls on the latch rod, overcoming the bias of the spring and disengaging the latch rod from the abutment.

Certain implementations of this aspect of the invention provide that: the latch rod is movable along a latch rod axis, a flexible release cord is attached to the latch rod, disposed in the interior region and extend substantially along the latch rod axis; guide pins direct the flexible hasp cord and the flexible release cord away from the latch rod along the latch rod axis; the fixed object is a clip and the abutment is an aperture in the clip; the securing means includes a stationary hasp mounted to the exterior of the door proximate to the hasp; the active hasp includes a loop formed in the flexible cord distal to the latch rod.

BRIEF DESCRIPTION OF THE DRAWINGS

Further features of the invention, its nature, and various advantages will become more apparent from the accompanying drawings, and the following detailed description of the invention, in which like reference numerals refer to like elements, and in which.

DESCRIPTION OF PREFERRED EMBODIMENTS

Figure 1:
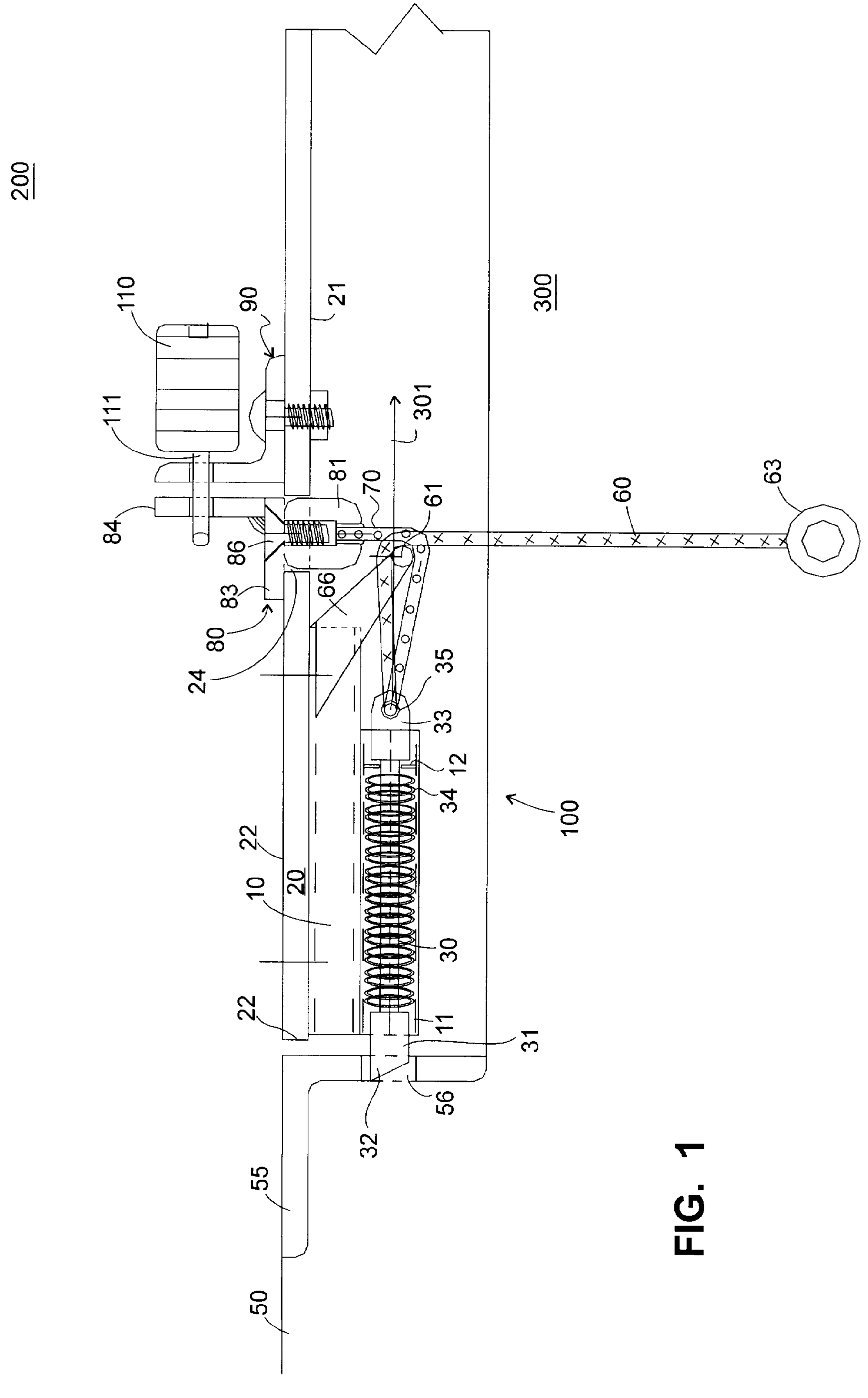
FIG. 1 is a side view in cut-away of the lock assembly in accord with an embodiment of the invention, showing the door in a closed, locked position.
Figure 2:
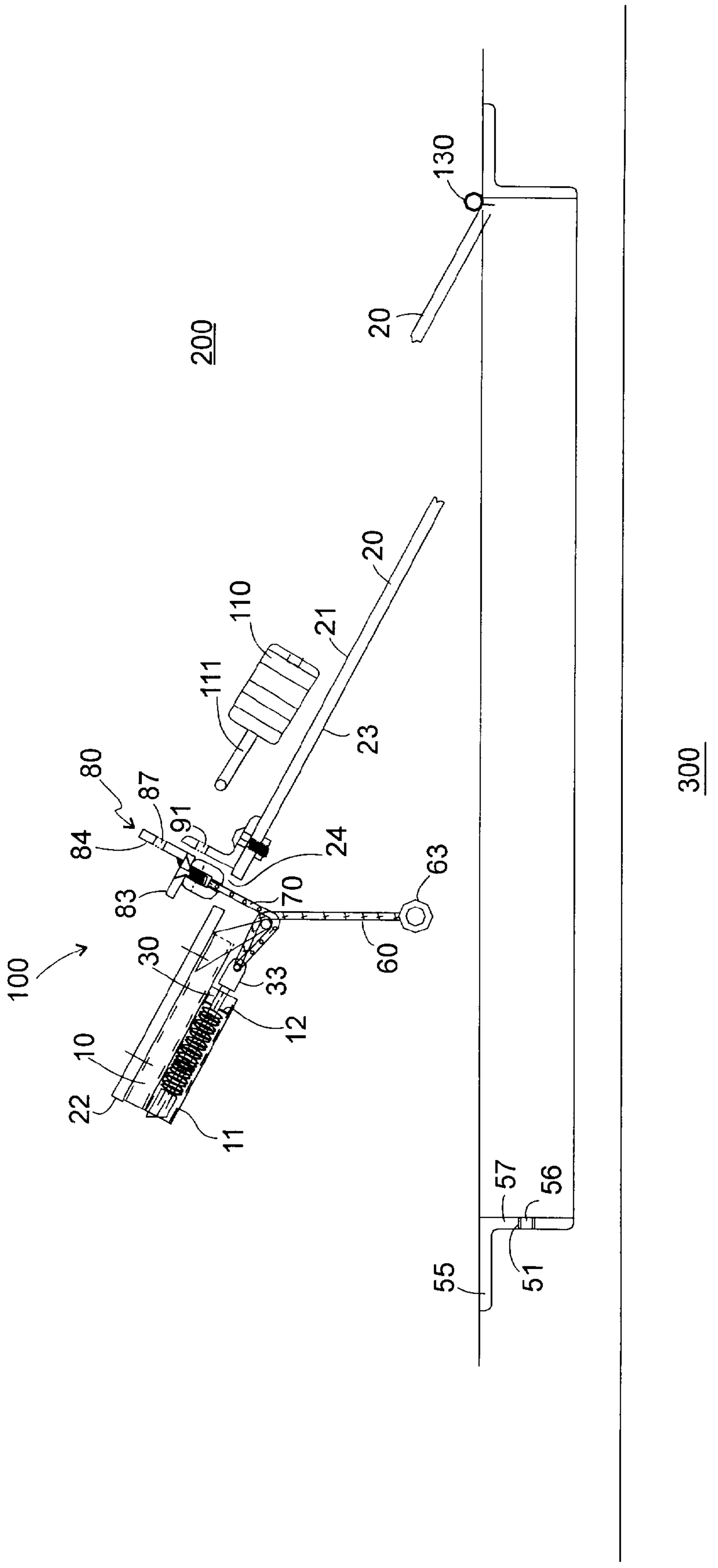
FIG. 2 is a side view in partial cut-away of the lock assembly of FIG. 1, showing the door in an open, unlocked condition.
Figure 3:
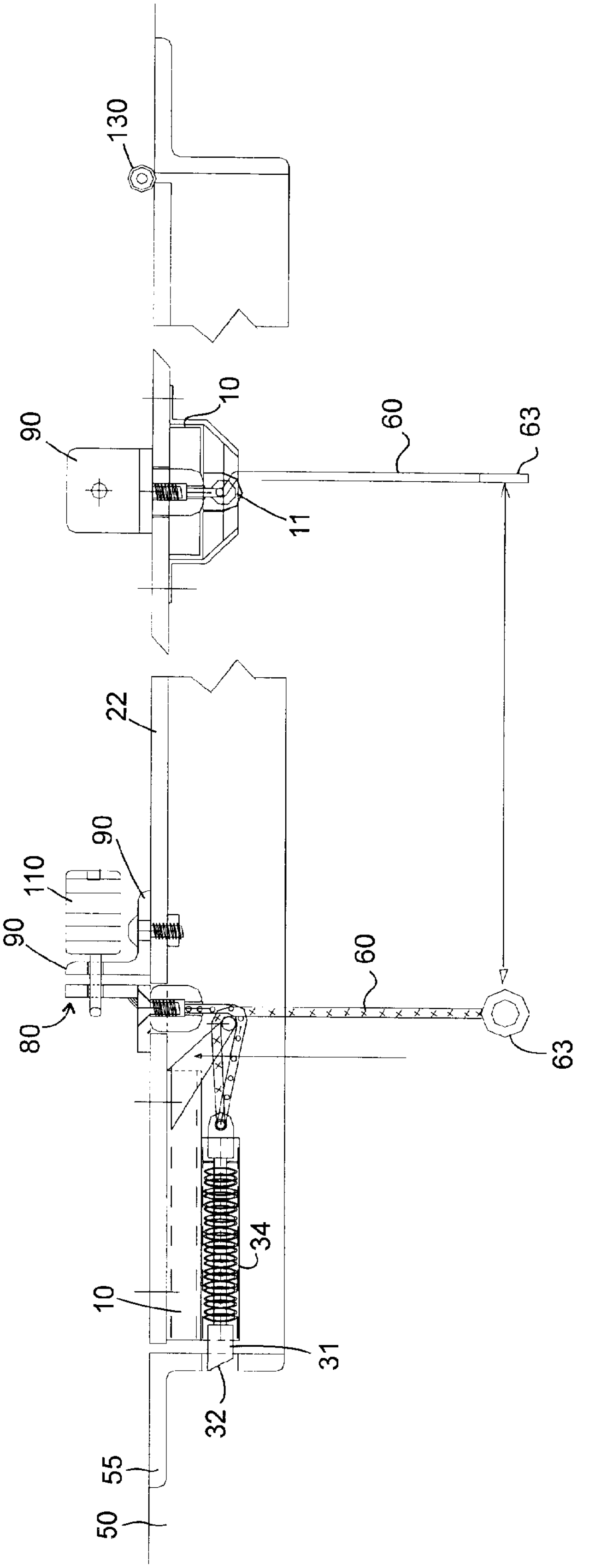
FIG. 3 is a side view of the lock assembly of FIG. 1, with a partial rotated view of the lock assembly.

Referring to FIGS. 1, 2 and 3, a lock assembly 100 in accord with one aspect of the invention is shown. Generally, the assembly is used to lock a door 20 in a closed position with respect to a fixed object 50, such as a door jam. It will be appreciated that the apparatus can also be used to lock two doors together, such as in a double door configuration, wherein one of the two doors would be deemed the "fixed object" for these purposes. Further, the lock assembly can be employed on gates, truck doors, or similar applications and still practice the invention. For clarity's sake, this patent application will refer to the "interior region" 300 and the "exterior region" 200 defined by the door. The interior of the door includes the latch mechanism and the pull release while the exterior includes the active hasp and the padlock. It will be appreciated that generally the locking assembly may be positioned on either side of the door and practice the invention.

Figure 5:
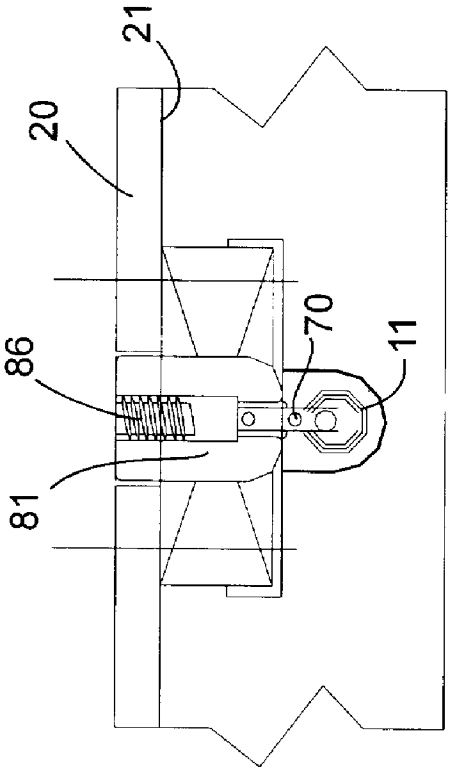
FIG. 5 is an isolation view of the base for the active hasp of the locking assembly of FIG. 1.
Figure 4:
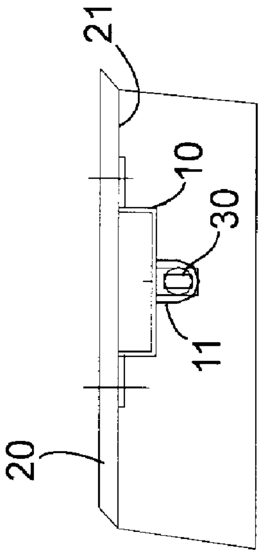
FIG. 4 is an isolation view of the casing and mounting bracket for use with the lock assembly of FIG. 1.
Figure 7:
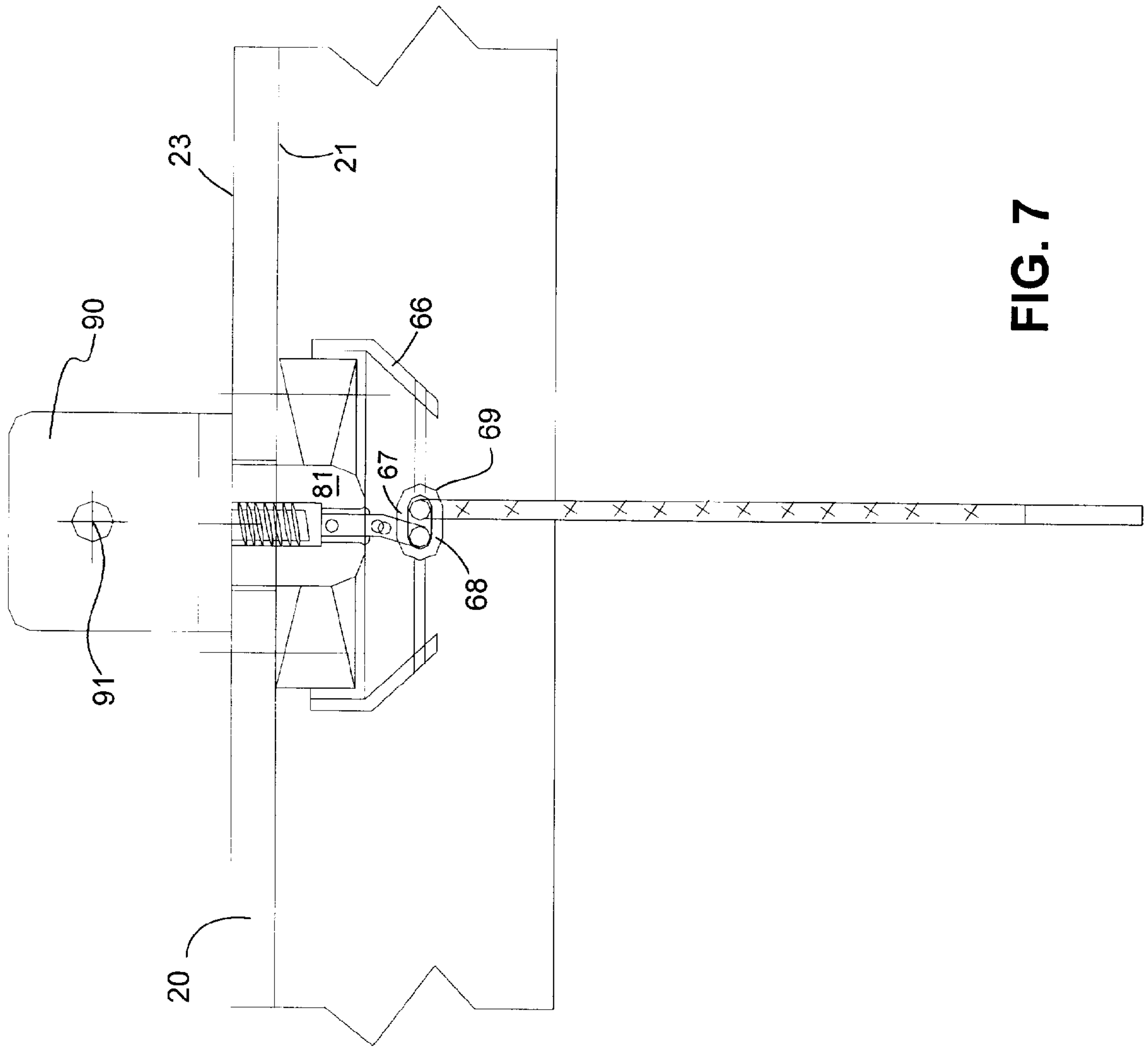
FIG. 7 is a front view of the lock assembly of FIG. 6.

Referring to FIGS. 1–3, a mounting bracket 10 is mounted to the interior face 21 of the door 20 near its side edge 22 (see also FIGS. 4, 5 and 7). The mounting bracket may be welded, bolted or otherwise secured to the door. A hollow, cylindrical casing 11 is mounted to the bracket distal to the door. A flat circular plate 12 forms a collar near one end of the casing distal to the side edge of the door. A central opening 13 is provided in the collar. A lubricant may be supplied along the interior of the casing but this is not required. Preferably, the axis of the cylindrical casing is parallel to the interior surface 21 of the door. Of course, the casing can be angled and still practice the invention, as a particular application dictates.

A latch rod 30 is positioned within the casing 11 and extends along the axis of the casing through the central opening 13 of the collar 12. The latch rod is movable along a latch rod axis 301. A latch tip 31 with a beveled end 32 (see also FIG. 8) is attached at the end of the latch rod proximate to the side edge 22 of the door 20. An anchor 33 is attached to the opposite end of the latch rod, on the opposite side of the collar. A coil spring 34 is disposed between the collar 12 and the latch tip 31, operably engaged to the latch rod and the casing, such that the latch tip is biased outward from the casing. Guides can be provided within the casing or on the opening of the collar to maintain the latch rod 30 (and thus the beveled end 32) at a selected orientation. This can be particularly useful when closing the door 20, as discussed more fully below. The latch rod can be a commercial bolt, such as one of the chain bolts available from The Stanley Works of New Britain, Conn.

Referring still to FIGS. 1–3, an abutment 51 (see also, FIG. 8) is provided on a fixed object 50 to engage the latch tip 31 when the door 20 is closed. As currently preferred, especially for retrofitting existing doors, a clip 55 is mounted to the fixed object, such as a door jam (or other door, etc.), opposite the mounting bracket 10 when the door 20 is in a closed position. An aperture 56 is provided in the clip. When the door is closed, the latch tip 31 extends into and engages the aperture. The aperture creates a lip 57 that contacts the latch tip, preventing its movement and, thereby locking the door in a closed position. It will be appreciated that the aperture can be located directly in the door jam or opposite door itself. A separate clip is not required to practice the invention. Further, the function of the aperture can be served by any abutment or other structure that impedes the movement of the latch tip in the extended position and still practice the invention.

Figure 8:
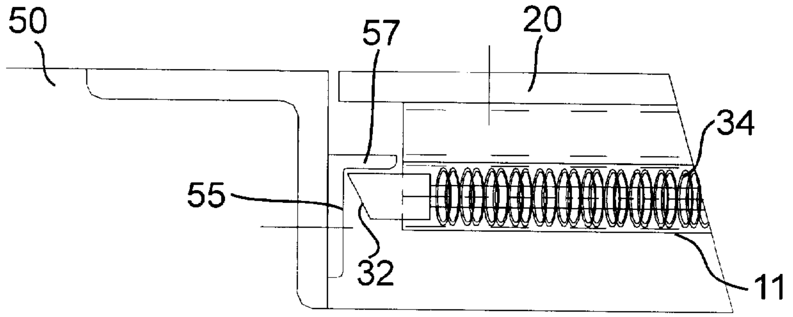
FIG. 8 is a side view of the latching rod of the invention engaged to a lip.
Figure 9A:
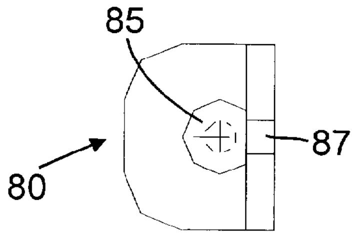
FIG. 9A is a top view of the active hasp.
Figure 10A:
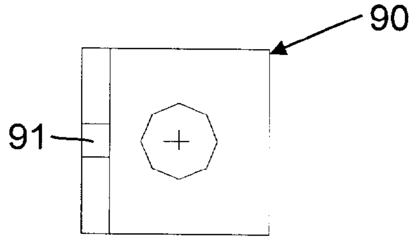
FIG. 10A is a top view of the stationary hasp.
Figure 9B:
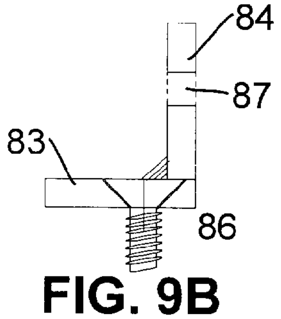
FIG. 9B is a side view of the active hasp.
Figure 10B:
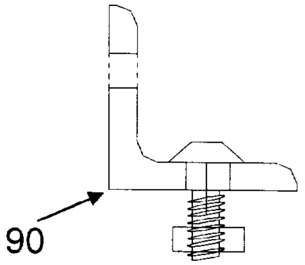
FIG. 10B is a side view of the stationary hasp.
Figure 9C:
FIG. 9C is a top view of the base.
Figure 9D:
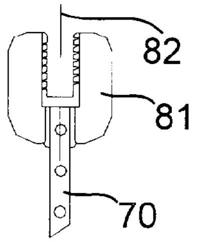
FIG. 9D is a side view of the base.

Referring to FIG. 8, the clip 55 may be mounted to the door frame or other fixed object 50 to thereby define the lip 57. When closing the door, the beveled end 32 of the latch tip 31 slides over the end of the lip, causing the coil spring 34 to be compressed. Once the latch tip has cleared the tip, the coil spring biases the latch tip outward such that it extends beyond the edge of the lip. The clip shown in FIG. 8 can be easily mounted to existing door frames or mating doors to allow use of the lock assembly 100 with previously installed doors.

The anchor 33 is provided with a mooring 35, such as a hole. In the embodiment shown in FIGS. 1 and 2, a flexible member, such as a release arm or cord 60, is connected to the anchor at the mooring and directed over a guide pin 61 such that the release cord extends substantially, at least in part, along the latch rod axis 301. The guide pin can be mounted to the door 20 by a guide bracket 66. A hand grip, such as a finger ring 63, is attached at the end of the release arm distal to the anchor. When the finger ring is tugged, the release arm 60 is pulled over the guide pin 61, overcoming the bias of the spring 34 and moving the anchor away from the collar 12. As the anchor is moved, the latch rod 30 and the latch tip 31 are also displaced away from the clip 55 such that the latch tip disengages the aperture 56, allowing the door 20 to open freely.

A second flexible member, such as a hasp arm or cord 70, is also connected to the anchor 33 at the mooring 35. The hasp arm extends over the opposite side of the guide pin 61 and is connected to an active hasp 80 such that the hasp cord extends substantially, at least in part, along the latch rod axis 301. Referring particularly to the views of FIGS. 9A–D and 10A–B, the active hasp includes a base 81 which is internally threaded and which has an internal cable seat 82. The end of the hasp arm 70 distal to the anchor 33 is secured to the base at the cable seat. A disc or other enlargement may be provided at the end of the hasp arm to engage the cable seat, preventing the hasp arm from slipping completely through the base. The base fits snugly into an opening 24 in the door 20.

The active hasp 80 has an L-shaped profile including a base leg 83 and a side leg 84. The base leg has a bore hole 85 for receiving a permanent screw 86. The screw extends through the bore hole and engages the internal threads of the base 81, thereby securing the base to the base leg. Of course, the screw could be integrally formed with the base leg but this would make assembly more difficult. Further, other means, such as a stud, could be used to attach the base leg to the base. The side leg has an opening 87 to receive the U-shaped member 111 of a padlock 110, as in traditional hasps.

A stationary hasp 90 is mounted to the exterior face 22 of the door 20 and positioned proximate the active hasp 80. The stationary hasp also has an opening 91 to receive the U-shaped member 111 of the padlock 110.

Figure 6:
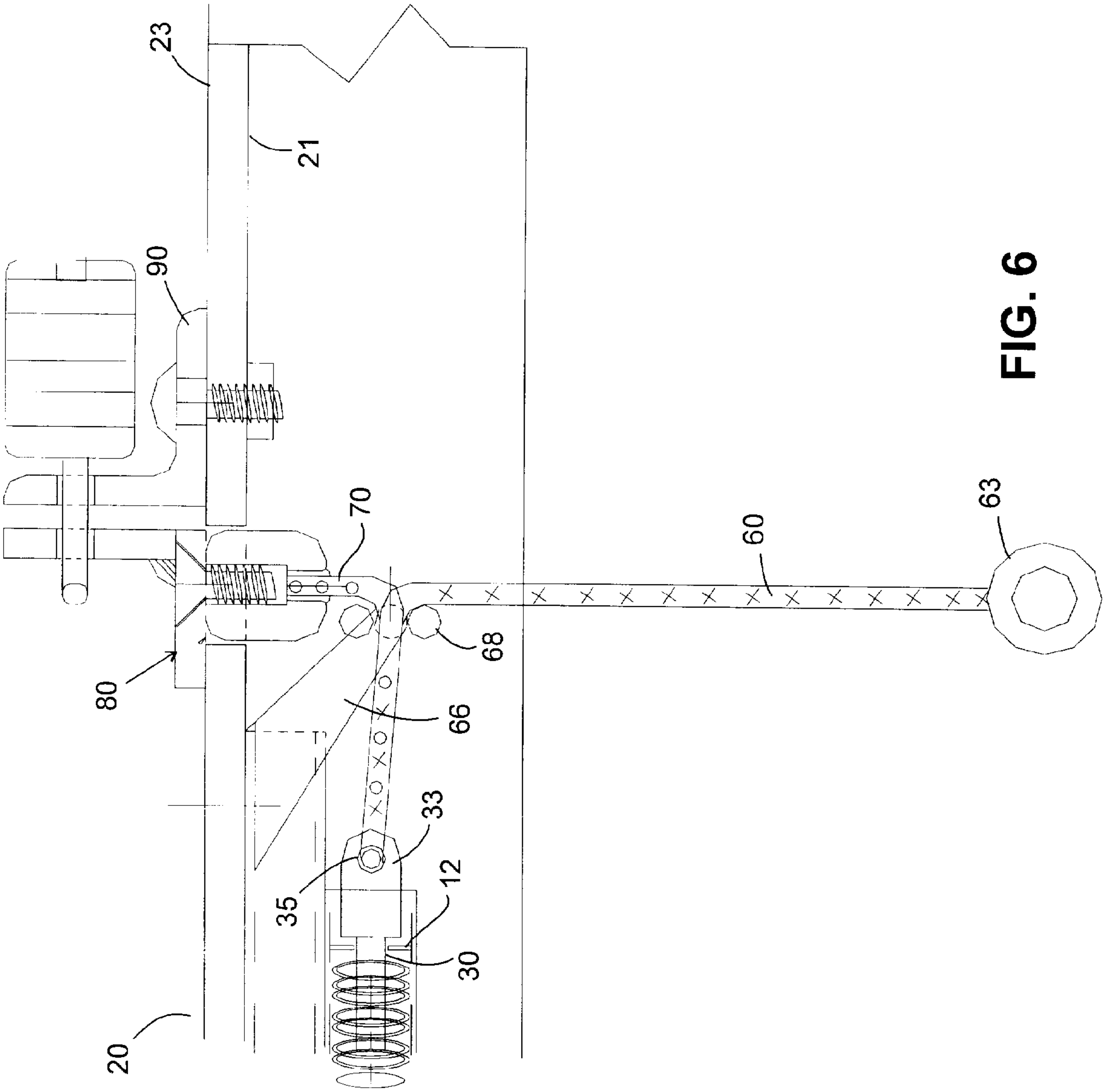
FIG. 6 is a side view in partial cut-away of another embodiment of the invention.

In accord with another aspect of the invention shown in FIGS. 6–7, two distinct guide pins 67, 68 are provided. The upper guide pin 68 directs the hasp arm 70 toward the active hasp 80. The lower guide pin 6 directs the release arm 60 toward the finger ring 63. These pins can be formed by a loop 69 mounted on the interior face 21 of the door 20 by a guide bracket 66.

To operate the lock assembly 100 of the instant invention, the door 20 is rotated to a closed position about a hinge 130, such that the latch tip 31 engages the aperture 56 of the fixed object 50 (see FIG. 1). The U-shaped member 111 of the padlock 110 is slipped through the openings 87, 91 in the active hasp 80 and the stationary hasp 90, receptively. Consequently, the active hasp cannot be moved away from the door, the hasp cord 70 cannot be pulled and the door is locked from external to the door. The padlock must be removed before the active hasp can be displaced to unlock the door. However, even when the padlock is locked, on the interior 300 of the door, the finger ring 63 can be pulled, displacing the flexible release cord 60 which, in turn, pulls on the latch rod 30. The latch rod overcomes the bias of the spring 34 and the latch tip 31 is disengaged from the aperture 56 and allowing the door to be opened (see FIG. 2).

From the exterior 200, the padlock 110 must be unlocked and removed from the active hasp 80 and the stationary hasp 90. The user then grasps the active hasp. A finger grip or knob may be provided to make this gripping easier. Alternatively, the user may simply grasp the active hasp by the opening 87 in the side leg 84 and pull the active hasp away from the door. This causes the hasp arm 70 to move over the guide pin 61 and pull on the anchor 33, in turn, overcoming the bias of the spring 34 and displacing the latch rod 30 away from the fixed object 50. The latch 31 tip is thus disengaged from the aperture 56, allowing the door 20 to be opened.

In the embodiments shown in FIGS. 1 and 2, the hasp arm 70 and the release arm 60 include a single flexible cord attached to the anchor 33. Alternatively, two distinct flexible cords or cables can be used if preferred.

While it is preferred that the lock assembly 100 be opened from the interior by pulling the finger ring 63, it will be appreciated that other means can also be provided for disengaging the latch tip from the interior 300. In particular, a handle can be attached to the anchor 33. This handle can be readily grasped on the interior 300 of the door and moved laterally, thereby disengaging the latch tip from the abutment 51. However, such a handle would be inaccessible from the exterior 200 of the door. Other means for displacing the abutment such that it disengages the latch tip may be provided (for example, by mounting the clip 55 to the door jam on rails so that it can slide away from the door 20). Again, this will permit the user on the inside to disengage the latch while preventing the person at the exterior from opening the door without first opening the padlock.

While this invention has been described with reference to specific embodiments disclosed herein, it is not confined to the details set forth and the patent is intended to include modifications and changes which may come within and extend from the disclosed embodiments. In particular, while a stationary hasp 90 is currently preferred, it will be understood that any structure that permits the securement of the active hasp 80 in a non-moving condition can be employed. For example, a swing bar can be used to cover the base leg 83, which swing bar is then separately locked in place. The swing bar will effectively prevent movement of the active hasp until that separate lock is removed.

Currently, it is preferred that the hasp arm 70 be attached to the active hasp 80. Alternatively, the free end of the hasp arm can be formed into a loop that can be engaged by the U-shaped member 111 of the padlock 110. As such, it will be difficult to move the loop, and thus the hasp arm, when the padlock engages the loop.

The spring bias is currently overcome by a directed pull on the anchor 33, via the release arm 60 or the hasp arm 70. Of course, various lever mechanisms and the like may be employed to provide an additional mechanical advantage if desired. In particular, a panic bar or push button can be used to actuate the release arm from the interior with a simple pushing movement, as one skilled in the art would appreciate.

As currently preferred, the engaging means includes a latch rod moving linearly along a latch rod axis and biased by a coil spring. It will be appreciated that the engaging means may include other locking mechanisms that employ a rotational or other movement. Further, other biasing means, such as magnets, gravity and the like may be employed and still practice the invention that is defined by the following claims:

I claim:

1. A lock assembly for securing a door to a fixed object, the door having an interior face, an exterior face and an edge, and the fixed object having an aperture, the door being movable from a closed position in which the edge is proximate to the aperture, to an open position in which the edge is remote from the aperture, the lock assembly comprising:

a casing mounted to the interior face of the door near the edge;

a latch rod slidingly mounted to the casing for movement along a latch rod axis;

a latch tip disposed on the latch rod near the edge;

a spring disposed in the casing and operably engaged to the latch rod, such that the latch tip is normally biased outward from the casing in a position to engage the aperture of the fixed object when the door is in the closed position;

an anchor mounted to the latch rod distal to the latch tip;

a flexible release cord attached to the anchor and directed substantially along the interior face of the door and along the latch rod axis;

a flexible hasp cord attached to the anchor and extending substantially along the latch rod axis;

an active hasp connected to the flexible hasp cord distal to the anchor and disposed at the exterior face of the door; and a stationary hasp fixedly mounted proximate to the active hasp;

wherein, when the active hasp is displaced, the flexible hasp cord pulls on the anchor, overcoming the bias of the spring and disengaging the latch tip from the aperture.

2. The lock assembly of claim 1 in which the flexible hasp cord extends through the door.

3. The lock assembly of claim 1 wherein the stationary hasp is fixedly mounted to the exterior face of the door and wherein openings are positioned in the active hasp and the stationary hasp, the lock assembly further comprising a padlock engaged to the openings in the active hasp and the stationary hasp.

4. A padlock safety assembly for securing a movable door to fixed object such that the door can be locked in a closed position from exterior to the door while being openable from the interior of the door, the door having an interior face, an exterior face and a side edge, the door being movable from the closed position wherein the side edge of the door is proximate the fixed object to an open position wherein the side edge is remote from the fixed object, the fixed object having a lip, the padlock safety assembly comprising:

a latch rod slidingly mounted to the interior face of the door proximate to the side edge, the latch rod being movable along a latch rod axis from a projected position in which it extends toward the side edge to a recessed position;

a spring attached to the latch rod and the door for biasing the latch rod toward the projected position;

a flexible cord attached to the latch rod and extending substantially along the latch rod axis and through the door;

a hasp connected to the flexible cord distal to the latch rod and disposed at the exterior of the door; and means for securing the hasp in a fixed position on the exterior face of the door;

wherein, when the door is in the closed position and the latch rod is in the projected position, the latch rod engages the lip of the fixed object and, when the hasp is displaced, the flexible cord pulls on the latch rod, overcoming the bias of the spring and disengaging the latch rod from the lip.

5. The apparatus of claim 4 wherein the fixed object includes a clip and the lip defines, at least in part, an aperture in the clip.

6. The apparatus of claim 4 further comprising a casing mounted to the interior face of the door, wherein the latch rod is disposed within the casing and the spring is a coil spring disposed about the latch rod.

7. The apparatus of claim 6 further comprising a latch tip with a beveled edge mounted to the latch rod near the side edge of the door that is adapted to engage the lip of the fixed object.

8. The apparatus of claim 4 further comprising a flexible release cord attached to the latch rod, disposed on the interior of the door and extending substantially along the latch rod axis.

9. The apparatus of claim 8 wherein the securing means includes a stationary hasp mounted to the exterior of the door proximate to the hasp.

10. The apparatus of claim 9 wherein the hasp and the stationary hasp are L-shaped rigid members.

11. The apparatus of claim 4 wherein the hasp includes a loop formed in the flexible cord distal to the latch rod.

12. A padlock assembly for securing a movable door to fixed object, the door defining an interior region and an exterior region, and having a side edge, the fixed object having an abutment, the door being movable from the closed position wherein the side edge of the door is proximate the abutment, to an open position wherein the side edge is remote from the abutment, the padlock assembly comprising:

a latch rod slidingly mounted to the door and disposed in the interior region;

a latch tip disposed on the latch rod near the outer edge of the door, the latch rod being movable from a projected position in which the latch tip extends sufficiently to engage the abutment of the fixed object when the door is in a closed position to a recessed position in which the latch tip is displaced away from the abutment;

means for biasing the latch rod toward the projected position;

a flexible release cord attached to the latch rod;

a flexible hasp cord attached to the latch rod and directed toward the door;

an active hasp with an opening connected to the flexible hasp cord distal to the latch rod and disposed at the exterior of the door; and a stationary hasp fixedly mounted proximate to the active hasp;

wherein, when the active hasp is displaced, the flexible hasp cord pulls on the latch rod, overcoming the bias of the biasing means and disengaging the latch rod from the abutment.

13. A lock assembly for securing a door to an object, the door having an a first face, a second face and an edge, the object having an abutment, the lock assembly comprising:

means for engaging the door to the abutment disposed on the first face of the door proximate to the edge, the engaging means being movable from an engaged position in which the door is engaged to the abutment, to a released position in which the door is disengaged from the abutment;

means for biasing the engaging means toward the engaging position;

a flexible cord attached to the engaging means;

an active hasp connected to the flexible cord distal to the engaging means and disposed on the second face of the door; and means for securing the active hasp in fixed position on the second face of the door when the engaging means is in the engaged position;

wherein, when the active hasp is displaced, the flexible cord actuates the engaging means, overcoming the bias of the biasing means and displacing the engaging means toward the released position.

14. The lock assembly of claim 13 wherein:

the engaging means includes a mounting bracket mounted to the interior face of the door near the edge; a casing mounted to the mounting bracket; a collar disposed within the casing; a latch rod slidingly mounted to the casing and journaled within the collar for movement substantially along a latch rod axis; a latch tip mounted to the latch rod near the edge, an anchor mounted to the latch rod distal to the latch tip;

the biasing means includes a spring disposed in the casing between the collar and the latch tip, such that the latch tip is normally biased outward from the casing in a position to engage the abutment of the object; and the securing means comprises a stationary hasp fixedly attached to the door at the exterior face proximate to the active hasp;

the lock assembly further comprising a flexible release cord attached to the anchor and directed, at least partly, along the latch rod axis.

15. A padlock assembly for securing a movable door to fixed object, the door defining an interior region and an exterior region, and having a side edge, the fixed object having an abutment, the door being movable from a closed position in which the side edge is proximate to the abutment, to an open position in which the side edge is remote from the abutment, the padlock assembly comprising:

a latch rod slidingly mounted in the door, disposed in the interior region and movable from a projected position, in which the latch rod extends sufficiently to engage the abutment of the fixed object when the door is in a closed position, to a recessed position in which the latch rod is displaced away from the abutment;

a spring attached to the latch rod such that the latch rod is normally biased toward the projected position;

a flexible hasp cord attached to the latch rod;

an active hasp connected to the flexible hasp cord distal to the latch rod and disposed in the exterior region; and means for securing the active hasp in a fixed position with respect to the door;

wherein, when the active hasp is displaced, the flexible hasp cord pulls on the latch rod, overcoming the bias of the spring and disengaging the latch rod from the abutment.

16. The apparatus of claim 15 wherein the latch rod is movable along a latch rod axis, the apparatus further comprising a flexible release cord attached to the latch rod, disposed in the interior region and extending, at least partly, along the latch rod axis.

17. The apparatus of claim 16 further comprising guide pins for directing the flexible hasp cord and the flexible release cord directly away from the latch rod along the latch rod axis.

18. The apparatus of claim 17 wherein the fixed object is a clip and the abutment is an aperture in the clip.

19. The apparatus of claim 16 wherein the securing means includes a stationary hasp mounted to the exterior of the door proximate to the hasp.

20. The apparatus of claim 19 wherein the active hasp includes a loop formed in the flexible cord distal to the latch rod.

* * * * *